United States Patent
Yokoyama et al.

(10) Patent No.: US 12,304,399 B2
(45) Date of Patent: May 20, 2025

(54) DEFLECTOR DEVICE

(71) Applicant: KABUSHIKI KAISHA TOKAI-RIKA-DENKI-SEISAKUSHO, Aichi (JP)

(72) Inventors: Kazuyuki Yokoyama, Aichi (JP); Masahide Inayama, Aichi (JP); Daisuke Nakayama, Aichi (JP); Nobuhiro Kudo, Aichi (JP); Toshiya Ito, Aichi (JP); Kazunori Tanaka, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 332 days.

(21) Appl. No.: 18/158,130

(22) Filed: Jan. 23, 2023

(65) Prior Publication Data
US 2023/0242184 A1 Aug. 3, 2023

(30) Foreign Application Priority Data

Feb. 1, 2022 (JP) .................................. 2022-014376

(51) Int. Cl.
*B60R 16/00* (2006.01)
*B62D 35/00* (2006.01)
*B62D 35/02* (2006.01)

(52) U.S. Cl.
CPC .......... *B60R 16/005* (2013.01); *B62D 35/005* (2013.01); *B62D 35/02* (2013.01); *B60Y 2410/10* (2013.01)

(58) Field of Classification Search
CPC . B60R 16/005; B60R 16/0232; B60R 16/027; B62D 35/00; B62D 35/005; B62D 35/02
USPC ...................................................... 296/180.1
See application file for complete search history.

(56) References Cited

U.S. PATENT DOCUMENTS

| | | | |
|---|---|---|---|
| 7,930,855 B2* | 4/2011 | Yoshida | H02K 7/1166 49/360 |
| 10,081,400 B2* | 9/2018 | Abdoul Azizou | B62D 35/02 |
| 10,625,792 B2* | 4/2020 | Shiga | B62D 35/005 |
| 10,946,909 B2* | 3/2021 | Andre | G05G 5/06 |
| 2011/0049913 A1* | 3/2011 | Bernt | B60R 19/48 296/180.1 |
| 2017/0088197 A1* | 3/2017 | Heil | B62D 35/005 |

(Continued)

FOREIGN PATENT DOCUMENTS

JP 2021529119 10/2021

*Primary Examiner* — Jason S Daniels
(74) *Attorney, Agent, or Firm* — Dority & Manning, P.A.

(57) ABSTRACT

In a deflector device, a magnet is rotated when a deflector body is rotated, and a magnetic sensor also detects a rotational position of the magnet. Moreover, an interior of a housing body is partitioned by a motor base into a vehicle width direction outside of the interior and a vehicle width direction inside of the interior, with the magnet housed on the vehicle width direction outside of the interior of the housing body. The magnetic sensor is housed on the vehicle width direction inside of the interior of the housing body. This accordingly enables foreign matter ingression from the vehicle width direction outside of the interior of the housing body into the vehicle width direction inside thereof to be suppressed by the motor base, enabling foreign matter to be suppressed from reaching the magnetic sensor.

10 Claims, 9 Drawing Sheets

(56) References Cited

U.S. PATENT DOCUMENTS

2021/0139087 A1\* 5/2021 Promutico ............. B62D 37/02
2021/0237650 A1   8/2021 Hoogenboom et al.

\* cited by examiner

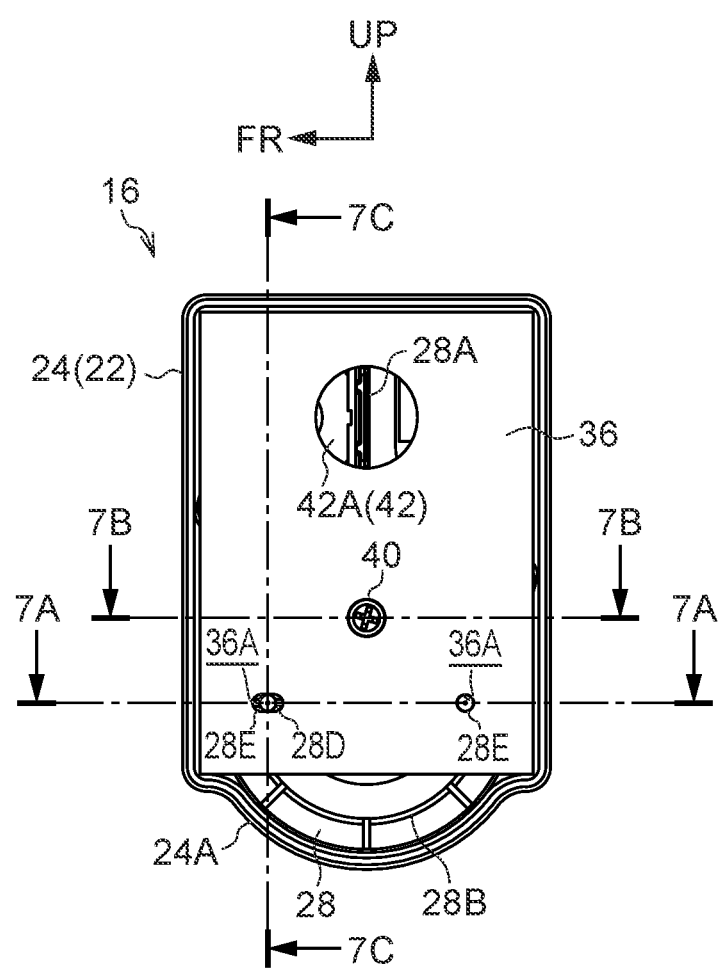

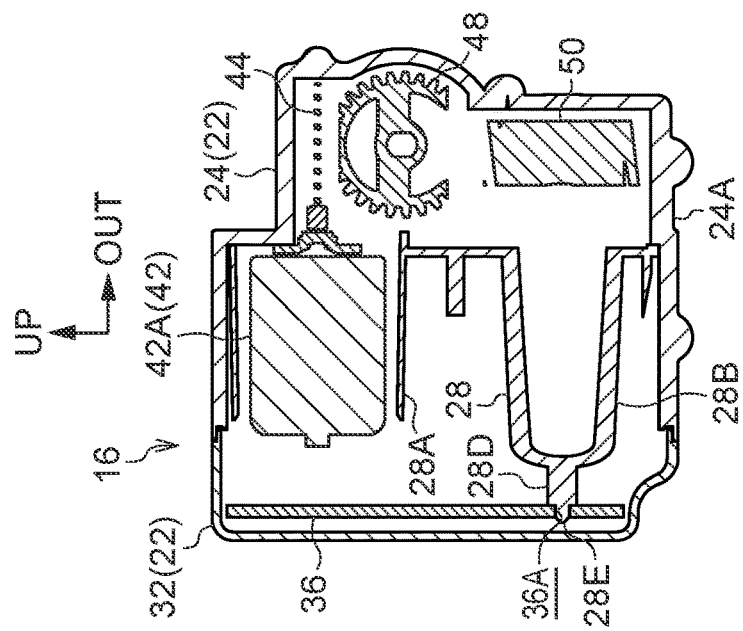
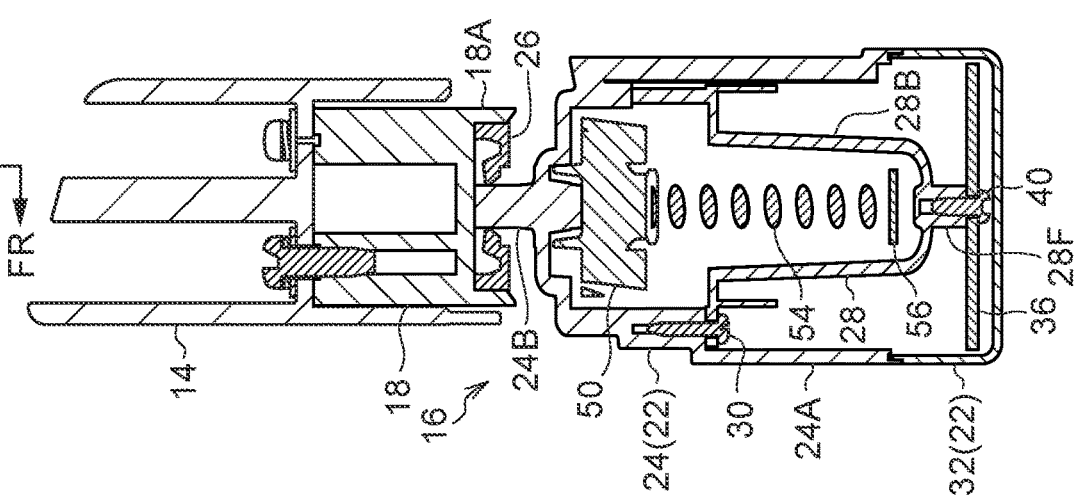
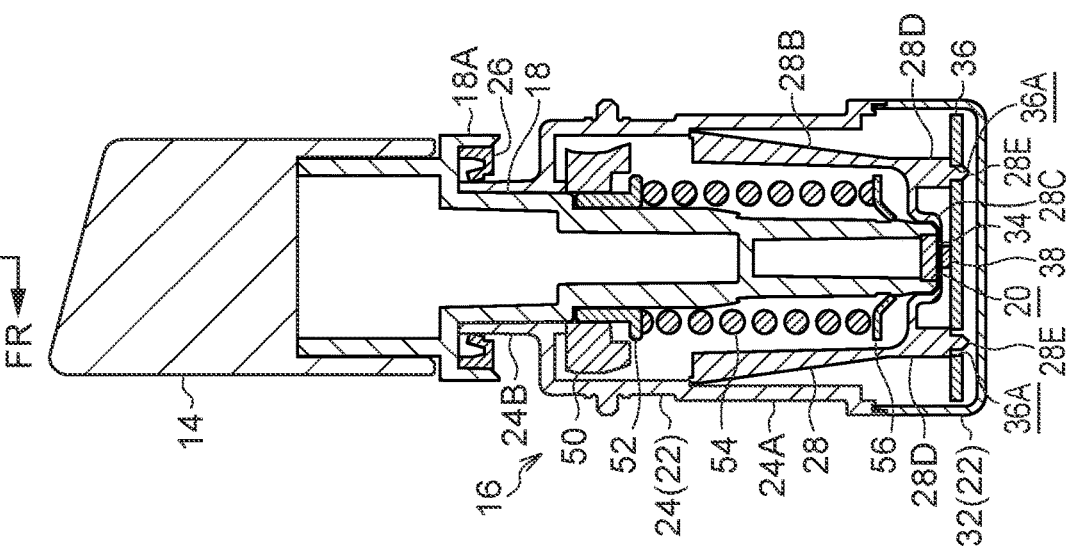

DEFLECTOR DEVICE

CROSS-REFERENCE TO RELATED APPLICATION

This application is based on and claims priority under 35 USC 119 from Japanese Patent Application No. 2022-14376 filed on Feb. 1, 2022, the disclosure of which is incorporated by reference herein.

BACKGROUND

Technical Field

The present invention relates to a deflector device that suppresses airflow onto a front wheel of a vehicle

Related Art

In an adjusting instrument of Japanese National-Phase Publication No. 2021-529119, a magnet is rotated, and an integrated circuit detects a rotational position of the magnet.

There is a desire in such adjusting instruments to be able to suppress foreign matter from reaching the integrated circuit.

SUMMARY

In consideration of the above circumstances, an object of the present invention is to obtain a deflector device capable of suppressing foreign matter from reaching a detection section.

A deflector device according to a first aspect of the present invention includes: a deflector body configured to be deployed in front of a front wheel of a vehicle by being rotated in a deploy direction to suppress airflow onto the front wheel and configured to be stowed in a vehicle body by being rotated in a stow direction; a housing body provided at a vehicle body side; a partition member configured to partition a housing body interior into one side and another side; a drive mechanism retained at the partition member and driven such that the deflector body is rotated; a detected portion housed at the one side of the housing body interior and configured to be rotated when the deflector body is rotated; and a detection section housed at the other side of the housing body interior and configured to detect a rotational position of the detected portion.

In the deflector device of the first aspect of the present invention, the drive mechanism is driven and the deflector body is rotated. Furthermore, the deflector body is deployed in front of the front wheel of the vehicle by the deflector body being rotated in the deploy direction, suppressing airflow onto the front wheel. The deflector body is also stowed in the vehicle body by the deflector body by being rotated in the stow direction.

Moreover, the housing body is provided at the vehicle body side, the partition member partitions the housing body interior into the one side and the other side, and the drive mechanism is retained at the partition member. Furthermore, the detected portion is housed at the one side of the housing body interior, the detected portion is rotated when the deflector body is rotated, and also the detection section detects the rotational position of the detected portion.

The detection section is housed at the other side of the housing body interior. This accordingly enables foreign matter to be suppressed by the partition member from arriving at the other side from the one side of the housing body interior, enabling foreign matter to be suppressed from arriving at the detection section.

A deflector device of a second aspect of the present invention is the deflector device of the first aspect of the present invention, wherein the partition member is abutted by the detected portion.

In the deflector device of the second aspect of the present invention, the partition member is abutted by the detected portion. This accordingly enables a high positional precision of the detected portion to be achieved.

A deflector device of a third aspect of the present invention is the deflector device of the second aspect of the present invention, further including a protruding portion provided protruding from the partition member and abutted by the detected portion.

In the deflector device of the third aspect of the present invention, the protruding portion is provided protruding from the partition member and the protruding portion is abutted by the detected portion. This accordingly enables a low sliding resistance of the detected portion against the partition member to be achieved.

A deflector device of a fourth aspect of the present invention is the deflector device of any one of the first aspect to the third aspect of the present invention, wherein the detection section is positioned by the partition member.

In the deflector device of the fourth aspect of the present invention, the detection section is positioned by the partition member. This accordingly enables a high positional precision of the detected portion to be achieved.

A deflector device of a fifth aspect of the present invention is the deflector device of any one of the first aspect to the fourth aspect of the present invention, further including a rotation member housed at the one side of the housing body interior and configured to be rotated when the deflector body is rotated, the detected portion being press-fitted into the rotation member.

In the deflector device of the fifth aspect of the present invention, the rotation member is housed at the one side of the housing body interior, the rotation member is rotated when the deflector body is rotated, and the detected portion is press-fitted into the rotation member. This accordingly enables rattling about of the detected portion with respect to the rotation member to be suppressed.

BRIEF DESCRIPTION OF THE DRAWINGS

Exemplary embodiments of the present invention will be described in detail based on the following figures, wherein:

FIG. 6 is a side view illustrating a drive device of the deflector device according to the exemplary embodiment of the present invention, as viewed from a vehicle width direction inside;

FIG. 7A is a cross-section illustrating the deflector device according to the exemplary embodiment of the present invention, as viewed from above (a cross-section along line 7A-7A of FIG. 6);

FIG. 7B is a cross-section illustrating the deflector device according to the exemplary embodiment of the present invention, as viewed from above (a cross-section along line 7B-7B of FIG. 6);

FIG. 7C is a cross-section illustrating the deflector device according to the exemplary embodiment of the present invention, as viewed from a vehicle rear (a cross-section along line 7C-7C of FIG. 6);

DETAILED DESCRIPTION

Figure 1:
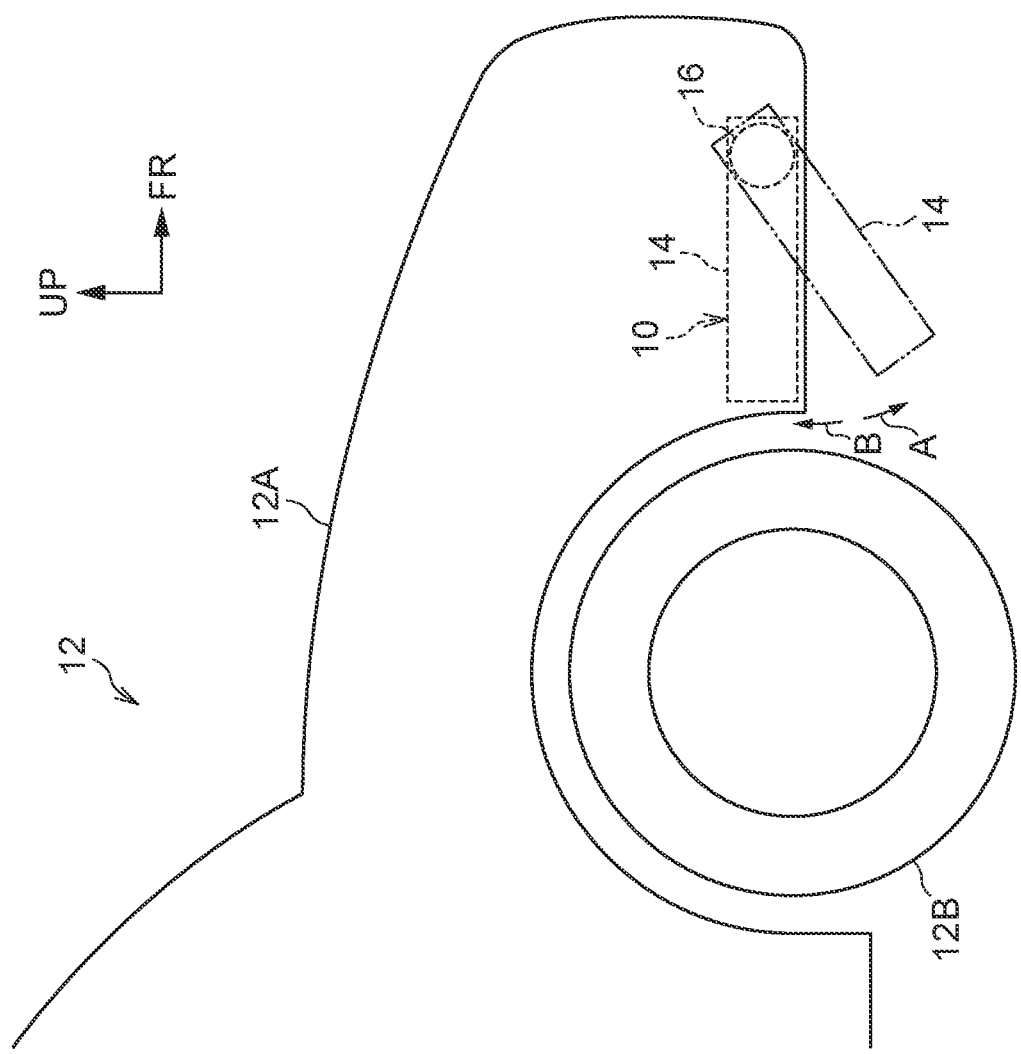
FIG. 1 is a side view illustrating a front section of a vehicle in an exemplary embodiment of the present invention, as viewed from a vehicle width direction outside.
Figure 2:
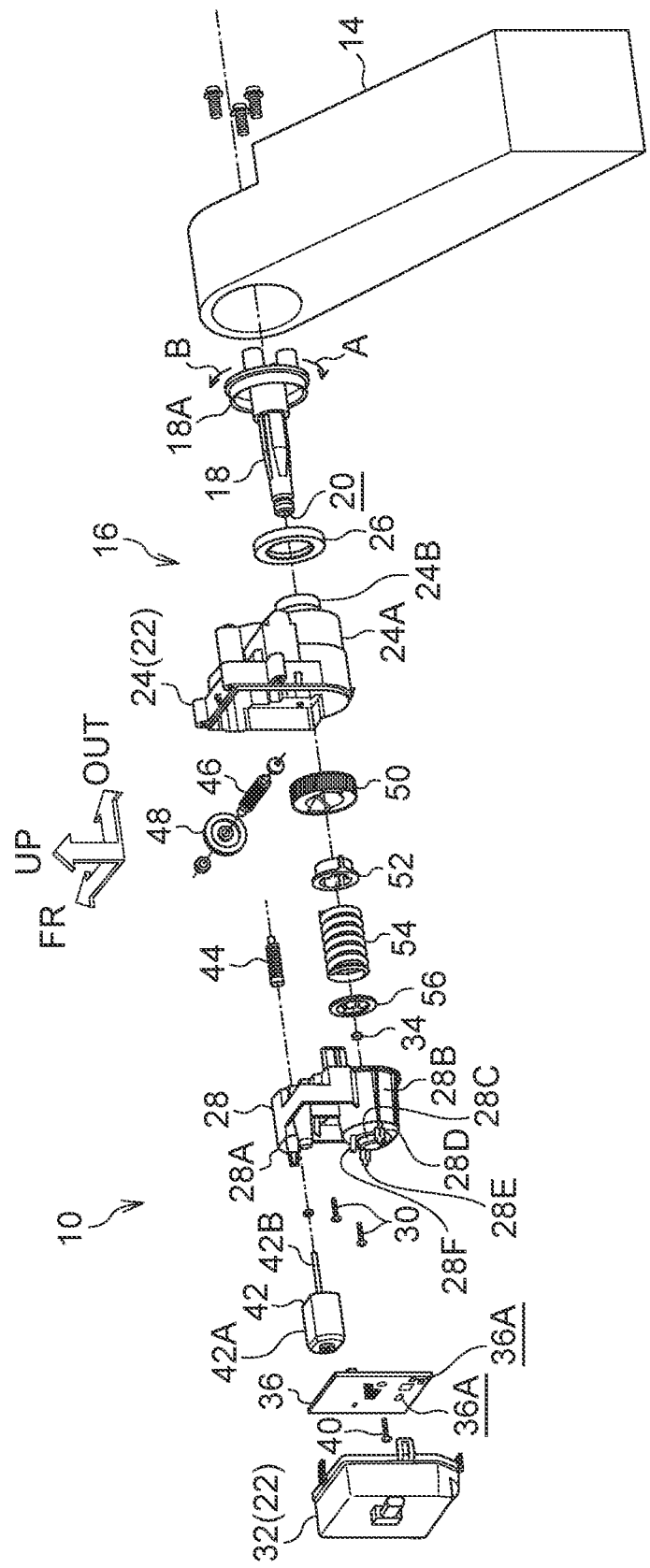
FIG. 2 is an exploded perspective view illustrating a deflector device according to the exemplary embodiment of the present invention, as viewed from a vehicle rear side and vehicle width direction inside.
Figure 3:
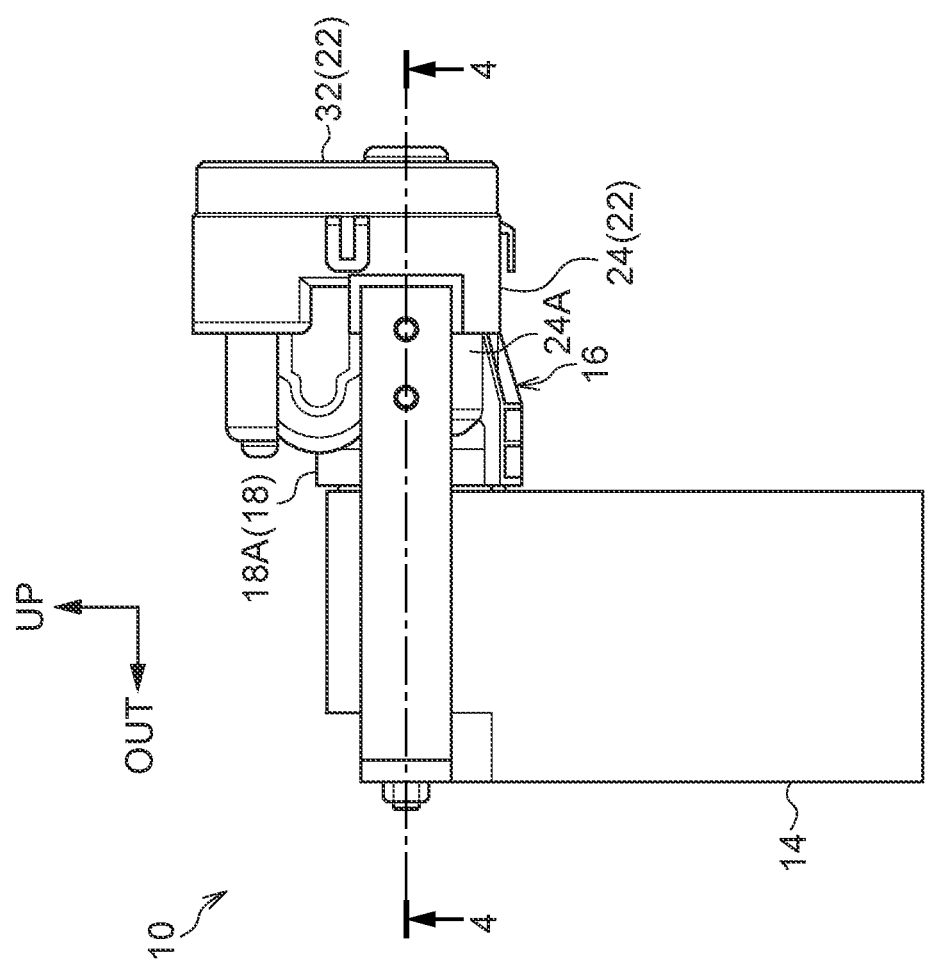
FIG. 3 is a front view illustrating the deflector device according to the exemplary embodiment of the present invention, as viewed from a vehicle front side.
Figure 4:
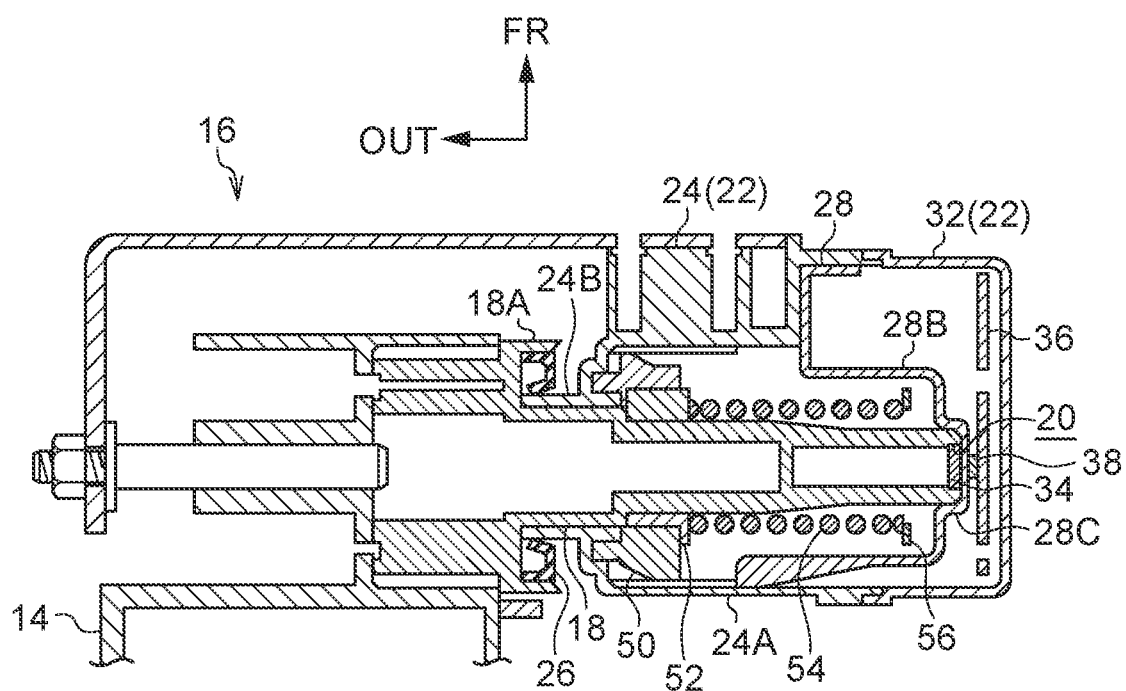
FIG. 4 is a cross-section illustrating the deflector device according to the exemplary embodiment of the present invention, as viewed from below (a cross-section along line 4-4 of FIG. 3)

FIG. 1 is a side view illustrating a front section of a vehicle 12 in an exemplary embodiment, as viewed from a vehicle width direction outside (vehicle right side), and FIG. 2 is an exploded perspective view illustrating a deflector device 10 according to the present exemplary embodiment, as viewed from a vehicle rear side and vehicle width direction inside. Furthermore, FIG. 3 is a front view illustrating the deflector device 10, as viewed from a vehicle front side, and FIG. 4 is a cross-section illustrating the deflector device 10, as viewed from below (a cross-section along line 4-4 of FIG. 3). Note that in the drawings an arrow FR indicates a vehicle front side, an arrow OUT indicates a vehicle width direction outside, and an arrow UP indicates upward.

As illustrated in FIG. 1, the deflector device 10 according to the present exemplary embodiment is installed inside a front end portion of a vehicle body 12A, and is disposed at a front side of a front wheel 12B of a vehicle 12.

As illustrated in FIG. 1 to FIG. 4, a deflector body 14 made from resin in a substantially cuboidal box shape is provided to the deflector device 10, with the deflector body 14 disposed at a stowed position (the broken line position in FIG. 1).

A drive device 16 is attached to a vehicle width direction inside of the deflector body 14, with the drive device 16 being fixed inside a front end portion of the vehicle body 12A.

A stand 18 made from resin in a substantially circular cylinder shape and serving as a rotation member is provided to the drive device 16, with an axial direction of the stand 18 oriented along the vehicle width direction. A vehicle width direction outside end portion of the stand 18 is joined to a vehicle front side end portion of the deflector body 14, with the deflector body 14 configured so as to be capable of rotating in a deploy direction A and a stow direction B about a center axis of the stand 18.

A seal tube 18A having a circular ring shape and serving as a sealing section is integrally formed coaxially in the vicinity of a vehicle width direction outside end portion of the stand 18, with the seal tube 18A having an L-shaped cross-section and provided with a bottom wall and a side wall. The bottom wall of the seal tube 18A has a circular ring plate shape and is formed as a single body with the stand 18. The side wall of the seal tube 18A has a circular cylinder shape that protrudes out toward the vehicle width direction inside from a radial direction outside end portion of the bottom wall of the seal tube 18A.

Figure 9:
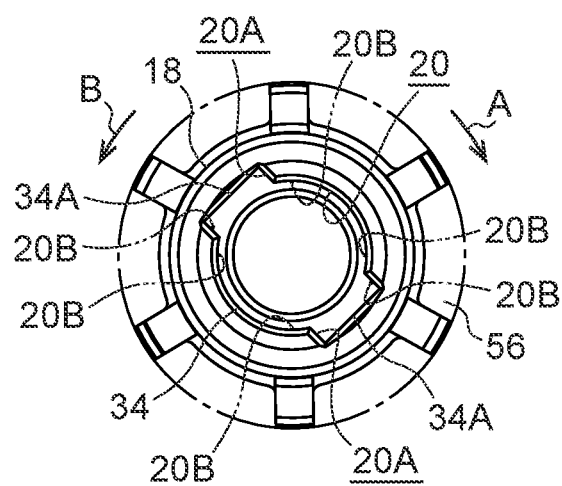
FIG. 9 is a side view illustrating a stand etc. of the deflector device according to the exemplary embodiment of the present invention, as viewed from a vehicle width direction inside.

A fixing hole 20 (see FIG. 9) having a circular shape is coaxially formed inside a vehicle width direction inside end portion of the stand 18, with a diameter of the fixing hole 20 slightly larger than a diameter of the inside of the stand 18 at portion further toward the vehicle width direction outside than the fixing hole 20, and the fixing hole 20 opening toward the vehicle width direction inside. A specific number (two in the present exemplary embodiment) of restriction holes 20A having a rectangular shape and serving as restricting portions are formed at a radial direction outside of the fixing hole 20, with the specific number of restriction holes 20A respectively communicating with the fixing hole 20 and arranged at a uniform spacing around the circumferential direction of the fixing hole 20. The restriction holes 20A open toward the vehicle width direction inside, and bottom faces (vehicle width direction outside faces) of the restriction holes 20A are flush with the bottom face (vehicle width direction outside face) of the fixing hole 20.

A specific number (four in the present exemplary embodiment) of triangular pillar shaped crush ribs 20B serving as press-fit portions are integrally formed to a circumferential face of the fixing hole 20, with the crush ribs 20B extending along the axial direction of the fixing hole 20. The specific number of crush ribs 20B are arranged at a uniform spacing around the circumferential direction of the fixing hole 20, and the restriction holes 20A are arranged at fixing hole 20 circumferential direction center positions between the crush ribs 20B. Furthermore, similar crush ribs 20B are also integrally formed to stow direction B side faces (or deploy direction A side faces) of the restriction holes 20A.

A case 24 made from resin in a box shape and serving as a support member configuring a housing body 22 is provided at the vehicle width direction inside of the stand 18, with the inside of the case 24 open toward the vehicle width direction inside. A housing tube 24A having a substantially bottomed circular cylinder shape is formed at a lower portion of the case 24, with the housing tube 24A having an axial direction oriented in the vehicle width direction and having an interior communicated with an upper portion of the case 24 interior. A support tube 24B having a circular cylinder shape and serving as a first support section is integrally formed coaxially to a bottom wall (vehicle width direction outside wall) of the housing tube 24A, with the support tube 24B piercing the bottom wall of the housing tube 24A and having an interior open toward the vehicle width direction outside.

The stand 18 is coaxially fitted into the support tube 24B, such that the support tube 24B rotatably supports the stand 18 and the stand 18 is coaxially inserted into the housing tube 24A. The bottom wall of the seal tube 18A of the stand 18 is abutted against the support tube 24B from the vehicle width direction outside, such that movement of the stand 18 toward the vehicle width direction inside is stopped. A seal ring 26 having a circular ring shape and serving as a seal member is inserted between the support tube 24B and the seal tube 18A, with the seal ring 26 made from rubber and having sealing properties. The seal ring 26 is sandwiched and elastically compressed between the support tube 24B and the side wall of the seal tube 18A, with the seal ring 26 sealing between the case 24 and the stand 18 and limiting the ingression of water into the case 24.

Figure 8A:
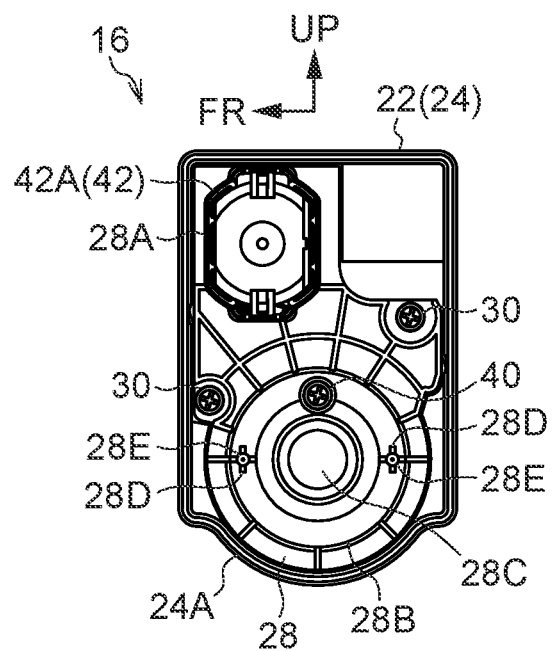
FIG. 8A is a side view illustrating a vehicle width direction inside of a motor base in a case of the drive device of the deflector device according to the exemplary embodiment of the present invention, as viewed from a vehicle width direction inside.

A motor base 28 (see FIG. 8A) made from resin and serving as a partition member is housed inside the case 24, with the outer periphery of the motor base 28 fitting together with the inner periphery of the case 24. A pair of fixing screws 30 are passed through up-down direction intermediate portions of the motor base 28, and the fixing screws 30 are screwed into the bottom wall (vehicle width direction outside wall) of the case 24 such that the motor base 28 is fixed (fastened) to the case 24.

A retaining tube 28A having a bottomed substantially elliptical tube shape and serving as a retention section is integrally formed to an upper portion of the motor base 28, with the retaining tube 28A protruding toward the vehicle width direction inside and having an interior open toward the vehicle width direction inside.

An insertion tube 28B having a bottomed substantially circular cylinder shape and serving as an insertion portion is integrally formed to a lower portion of the motor base 28, with the insertion tube 28B protruding toward the vehicle width direction inside and having an interior open toward the vehicle width direction outside. The insertion tube 28B is disposed coaxially to the housing tube 24A of the case 24, and the stand 18 is inserted coaxially into the insertion tube 28B. A fitting tube 28C having a bottomed substantially circular cylinder shape and serving as a second support section (fitting section) is integrally formed coaxially to the bottom wall (vehicle width direction inside wall) of the insertion tube 28B, with the fitting tube 28C protruding from the bottom wall of the insertion tube 28B toward the vehicle width direction inside. The inside of the fitting tube 28C opens into the insertion tube 28B, with a vehicle width direction inside end portion of the stand 18 coaxially fitted into the fitting tube 28C, such that the fitting tube 28C rotatably supports the stand 18.

Figure 5A:
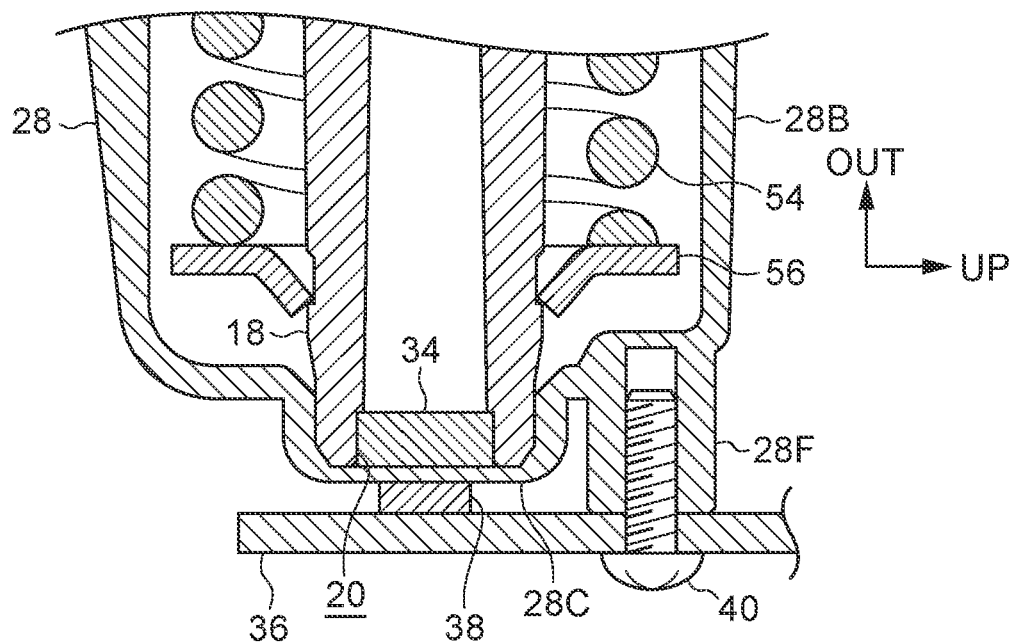
FIG. 5A is a cross-section illustrating relevant sections of the deflector device according to the exemplary embodiment of the present invention, as viewed from a vehicle front side.

A pair of installation pillars 28D having pillar shapes with a cross-shaped cross-section and serving as a positioning section are integrally formed to the bottom wall of the insertion tube 28B, with the pair of installation pillars 28D respectively protruding toward the vehicle width direction inside and arranged at a uniform spacing around the circumferential direction of the insertion tube 28B. Installation pins 28E having a circular pillar shape and serving as positioning sites are integrally formed coaxially at the vehicle width direction inside of the installation pillars 28D, with the installation pins 28E protruding toward the vehicle width direction inside. An installation tube 28F (see FIG. 5A) having a circular cylinder shape and serving as a positioning section is integrally formed to the bottom wall of the insertion tube 28B at an insertion tube 28B circumferential direction center position between the installation pillars 28D, with the installation tube 28F protruding toward the vehicle width direction inside.

A cover 32 made from resin in a box shape and serving as a cover member configuring the housing body 22 is provided at the vehicle width direction inside of the case 24 and the motor base 28, with the inside of the cover 32 open toward the vehicle width direction outside. A vehicle width direction inside end portion of the case 24 is fitted into and fixed to a vehicle width direction outside end portion of the cover 32, with the cover 32 covering and sealing the vehicle width direction inside of the case 24 and the motor base 28. The inside of the housing body 22 (of the case 24 and the cover 32) is partitioned by the motor base 28 into a vehicle width direction outside (one side) and a vehicle width direction inside (other side).

The housing body 22 is fixed inside a front end portion of the vehicle body 12A, with the deflector device 10 thereby being installed inside the front end portion of the vehicle body 12A.

Figure 5B:
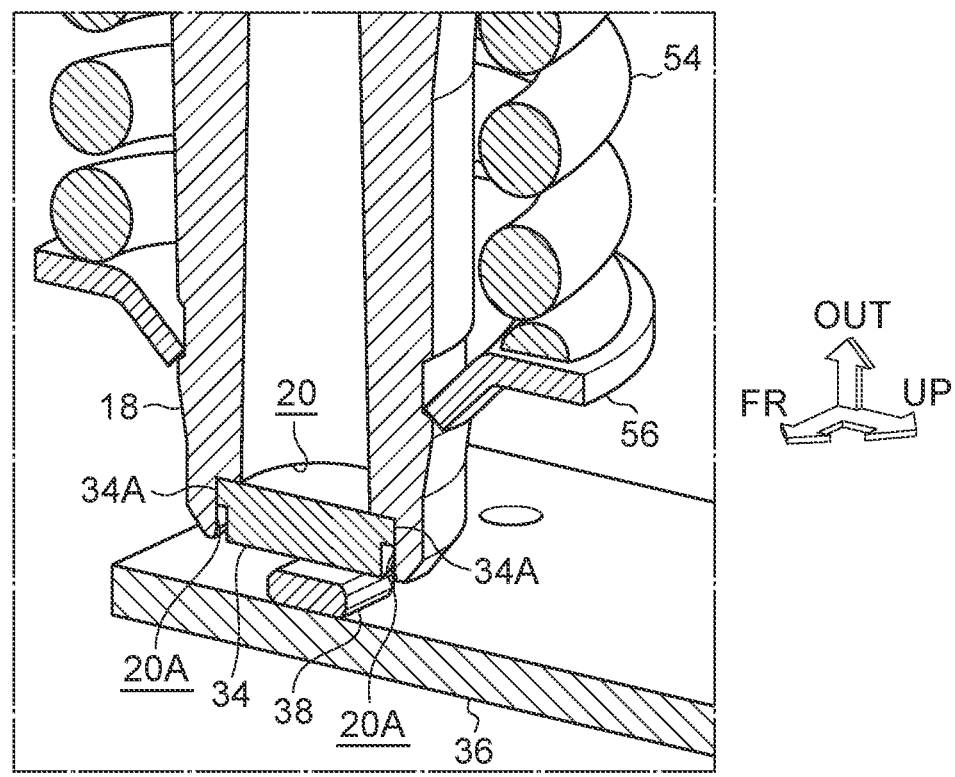
FIG. 5B is a cross-section perspective view illustrating the relevant sections of the deflector device according to the exemplary embodiment of the present invention, as viewed from a vehicle front and vehicle width direction outside.

A magnet 34 (see FIG. 5A, FIG. 5B, and FIG. 9) having a circular pillar shape and serving as a detected portion is coaxially fitted into the fixing hole 20 of the stand 18, with the magnet 34 crushing the crush ribs 20B of the fixing hole 20 and being press-fitted (fixed) into the fixing hole 20. When the motor base 28 is being fixed to the case 24, the magnet 34 is abutted (face-to-face contacted) against the bottom wall (vehicle width direction inside wall) of the fitting tube 28C of the motor base 28 and press-fitted into the fixing hole 20, such that the magnet 34 is not abutted by the bottom face of the fixing hole 20. The magnet 34 is thereby positioned in the axial direction (vehicle width direction) by the bottom wall of the fitting tube 28C and is positioned in the radial direction by the fixing hole 20.

A specific number (two in the present exemplary embodiment) of restriction pillars 34A having a substantially rectangular pillar shape and serving as restricted portions are integrally formed to the circumferential face of the magnet 34, with the specific number of the restriction pillars 34A arranged at a uniform spacing around the circumferential direction of the magnet 34 and with each vehicle width direction outside face thereof flush with the vehicle width direction outside face of the magnet 34. The restriction pillars 34A are fitted into the restriction holes 20A of the stand 18, and rotation of the magnet 34 with respect to the stand 18 is restricted thereby. When the magnet 34 is being press-fitted into the fixing hole 20, the restriction pillars 34A crush the crush ribs 20B of the restriction holes 20A and are press-fitted into the restriction holes 20A, such that the restriction pillars 34A are not abutted by the bottom face of the restriction holes 20A.

A circuit board 36 having a substantially rectangular plate shape is housed inside the cover 32, with the circuit board 36 disposed perpendicular to the vehicle width direction. A magnetic sensor 38 (magnetic resistance element) having a substantially rectangular plate shape and serving as a detection section is fixed to a lower portion of a vehicle width direction outside face of the circuit board 36, with the magnetic sensor 38 opposing the magnet 34 in the vehicle width direction across the bottom wall of the fitting tube 28C of the motor base 28, and disposed parallel and coaxially to the magnet 34. This means that the rotational position of the magnet 34 is detected by the magnetic sensor 38 detecting the direction of a magnetic field emitted by the magnet 34, such that the rotational position of the stand 18 and deflector body 14 is detected. The magnetic sensor 38 is configured to be slightly separated from or to abut (make face-to-face contact) with the bottom wall of the fitting tube 28C.

A pair of installation holes 36A (see FIG. 6, FIG. 7A, and FIG. 7C) serving as positioned portions are formed so as to pierce through the circuit board 36 at the surrounding of the magnetic sensor 38, with the pair of installation holes 36A arranged at a uniform spacing around the circumferential direction of the magnet 34. One of the installation holes 36A has a circular shape, and one of the installation pins 28E of the motor base 28 is fitted into the one installation hole 36A. The other of the installation holes 36A has a substantially elongated rectangular shape with a length direction oriented in a radial direction of the one installation hole 36A, with the other installation pin 28E of the motor base 28 fitted into the other installation hole 36A in a circumferential direction of the one installation hole 36A. The circuit board 36 and the magnetic sensor 38 are thereby positioned in the vehicle front-rear direction, up-down direction, and circumferential direction of the one installation hole 36A.

An installation screw 40 (see FIG. 5A, FIG. 6, and FIG. 7B) serving as an installation section passes through the circuit board 36 at a magnet 34 circumferential direction center position between the installation holes 36A, with the installation screw 40 screwed into the installation tube 28F of the motor base 28 and fixing (fastening) the circuit board 36 to the installation tube 28F. The circuit board 36 is abutted (face-to-face contacted) by leading end faces (vehicle width direction inside faces) of the installation pillars 28D of the motor base 28 and by a leading end face (vehicle width direction inside face) of the installation tube 28F, such that the circuit board 36 and the magnetic sensor 38 are thereby positioned in the vehicle width direction.

A motor 42 (see FIG. 7C and FIG. 8A) serving as a drive mechanism is provided to an upper portion inside the housing body 22. A body section 42A having substantially elliptical pillar shaped is provided to the motor 42, with the body section 42A fitted inside a retention tube 28A of the motor base 28 from the vehicle width direction inside and retained thereby. An output shaft 42B extends from the body section 42A toward the vehicle width direction outside, with the output shaft 42B piercing the motor base 28 and extending toward the vehicle width direction outside of the motor base 28. The motor 42 is drivable such that the output shaft 42B is rotated.

An initial-stage worm 44 made from resin is provided at the vehicle width direction outside of the motor 42, with a vehicle width direction outside end portion of the initial-stage worm 44 rotatably supported by a bottom wall of the case 24. The output shaft 42B of the motor 42 is coaxially inserted into the initial-stage worm 44 from the vehicle width direction inside, with the initial-stage worm 44 being integrally rotated together with the output shaft 42B by rotation of the output shaft 42B.

Figure 8B:
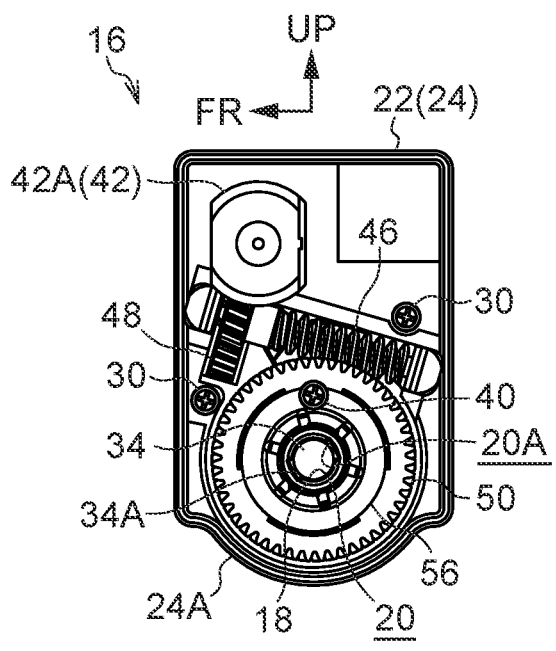
FIG. 8B is a side view illustrating a vehicle width direction outside of the motor base in the case of the drive device of the deflector device according to the exemplary embodiment of the present invention, as viewed from a vehicle width direction inside.

An output worm 46 (see FIG. 8B) made from metal is provided at a lower side of the initial-stage worm 44, with the output worm 46 rotatably supported between the bottom wall of the case 24 and the motor base 28. An initial-stage gear 48 (worm wheel) made from resin is coaxially supported at a vehicle front side of the output worm 46, with the initial-stage gear 48 integrally rotating together with the output worm 46. The initial-stage gear 48 is meshed with the initial-stage worm 44, and the initial-stage gear 48 and the output worm 46 are rotated as a single body by rotation of the initial-stage worm 44.

An output gear 50 (worm wheel, see FIG. 8B) made from metal in a substantially circular cylinder shape and serving as a drive member is provided at a lower side of the output worm 46, with the stand 18 coaxially fitted inside the output gear 50, and the output gear 50 rotatably supported by the stand 18. The output gear 50 is configured so as to be able to move in a vehicle width direction (axial direction) with respect to the stand 18, with the output gear 50 abutted against the support tube 24B of the case 24 from the vehicle width direction inside. The output gear 50 is meshed with the output worm 46 so as to have rotation limited thereby, and the output gear 50 is rotated by the output worm 46 being rotated.

A clutch 52 made from metal in a substantially circular cylinder shape and serving as a transmission member is provided at the vehicle width direction inside of the output gear 50, with the stand 18 fitting coaxially inside the clutch 52 and the clutch 52 supported by the stand 18. The clutch 52 is able to rotate as one with the stand 18, and is also able to move along the axial direction (vehicle width direction) with respect to the stand 18, with the clutch 52 engaging with the output gear 50 and rotated as one with the output gear 50.

A coil spring 54 made from metal and serving as an urging member is provided at the vehicle width direction inside of the clutch 52, with the stand 18 coaxially inserted inside the coil spring 54. A push nut 56 (see FIG. 8B) that is made from metal in a substantially circular ring plate shape and serves as an anchor member, is fitted and fixed to the stand 18 at a vicinity of a vehicle width direction inside end portion thereof, with the coil spring 54 spanning between the push nut 56 and the clutch 52. The coil spring 54 is compressed in an axial direction, and the coil spring 54 urges the clutch 52 and the output gear 50 toward the vehicle width direction outside, so as to limit release of the engagement between the output gear 50 and the clutch 52.

Next, description follows regarding operation of the present exemplary embodiment.

In the deflector device 10 configured as described above, in order to deploy the deflector body 14, the motor 42 in the drive device 16 is driven in the forward direction and the output shaft 42B, the initial-stage worm 44, the initial-stage gear 48, and the output worm 46 are rotated thereby such that the output gear 50, the clutch 52, the stand 18, and the deflector body 14 are rotated as one in the deploy direction A so as to dispose the deflector body 14 in the deployed position (the double-dot broken line position in FIG. 1). The deflector body 14 is thereby disposed at the lower side of the vehicle body 12A and at the vehicle front side of the front wheel 12B of the vehicle 12, suppresses travel-induced wind (airflow) of the vehicle 12 from flowing onto the front wheel 12B (travel-induced wind flowing onto a lower side of the front wheel 12B), thereby suppressing an increase in the air pressure from occurring at the vehicle front side of the front wheel 12B, and suppressing vehicle 12 air resistance and lift.

Moreover, in order to stow the deflector body 14, the motor 42 in the drive device 16 is driven in reverse, and the output shaft 42B, the initial-stage worm 44, the initial-stage gear 48, and the output worm 46 are rotated such that the output gear 50, the clutch 52, the stand 18, and the deflector body 14 are rotated as one in the stow direction B so as to dispose the deflector body 14 in the stowed position (the broken line position of FIG. 1).

Moreover, when the deflector body 14 is being rotated, the stand 18 is rotated as one therewith, and the magnet 34 of the stand 18 (the fixing hole 20) is also rotated as one therewith. Furthermore, the magnetic sensor 38 of the circuit board 36 detects the magnetic field of the magnet 34, and the rotational position of the stand 18 is detected by detecting the rotational position of the magnet 34, so as to detect the rotational position of the deflector body 14.

However, the interior of the housing body 22 (the case 24 and the cover 32) is partitioned by the motor base 28 into a vehicle width direction outside of the interior and a vehicle width direction inside of the interior, and the magnet 34 is housed at the vehicle width direction outside of the interior of the housing body 22. Furthermore, foreign matter (such as, for example, lubrication (in particular grease) coating the stand 18, the output shaft 42B of the motor 42, the initial-stage worm 44, the initial-stage gear 48, the output worm 46, the output gear 50, and the clutch 52) are also disposed on the vehicle width direction outside of the interior of the housing body 22.

The magnetic sensor 38 is, however, housed on the vehicle width direction inside of the interior of the housing body 22. This accordingly enables foreign matter ingression from the vehicle width direction outside of the interior of the housing body 22 into the vehicle width direction inside thereof to be suppressed by the motor base 28, enabling foreign matter to be suppressed from reaching the magnetic sensor 38. The precision of detecting the rotational position of the magnet 34 using the magnetic sensor 38 can be raised thereby, enabling an increase in the precision of detecting the rotational position of the deflector body 14.

Moreover, the bottom wall of the fitting tube 28C of the motor base 28 is abutted by the magnet 34. This enables the precision of positioning the magnet 34 in the vehicle width direction to be raised, enables the precision of positioning the magnet 34 and the magnetic sensor 38 in the vehicle width direction to be raised, enables the precision of detecting the rotational position of the magnet 34 using the magnetic sensor 38 to be raised, and accordingly enables the precision of detecting the rotational position of the deflector body 14 to be raised. Moreover, foreign matter ingression between the magnet 34 and the bottom wall of the fitting tube 28C, and foreign matter ingression between the magnet 34 and the magnetic sensor 38, can be suppressed, enabling the precision of detecting the rotational position of the magnet 34 using the magnetic sensor 38 to be raised, and accordingly enabling the precision of detecting the rotational position of the deflector body 14 to be raised.

Moreover, the pair of installation pins 28E of the motor base 28 are fitted into the pair of installation holes 36A of the circuit board 36, the circuit board 36 is fixed by the installation screw 40 to the installation tube 28F of the motor base 28, and the circuit board 36 is abutted by the leading end faces of the installation pillars 28D of the motor base 28 and the leading end face of the installation tube 28F thereof. This means that by positioning the circuit board 36 and the magnetic sensor 38 on the motor base 28 in the vehicle front-rear direction, up-down direction, and vehicle width direction, a high precision can be achieved in positioning of the magnetic sensor 38 in the vehicle front-rear direction, up-down direction, and vehicle width direction, the precision of detecting the rotational position of the magnet 34 using the magnetic sensor 38 can be raised, and accordingly the precision of detecting the rotational position of the deflector body 14 can be raised.

Moreover, the magnet 34 and the restriction pillars 34A are respectively press-fitted into the fixing hole 20 and the restriction holes 20A of the stand 18. This enables rattling about of the magnet 34 in the circumferential direction, radial direction, and axial direction (vehicle width direction) with respect to the stand 18 to be suppressed. The magnet 34 can thereby be positioned in the circumferential direction, radial direction, and axial direction with respect to the stand 18, enabling the precision of detecting the rotational position of the magnet 34 using the magnetic sensor 38 to be raised, and accordingly enabling the precision of detecting the rotational position of the deflector body 14 to be raised.

Moreover, the rotational position of the magnet 34 and the rotational position of the stand 18 can be aligned well with each other, enabling the precision of detecting the rotational position of the stand 18 by detecting the rotational position of the magnet 34 to be raised, and accordingly enabling the precision of detecting the rotational position of the deflector body 14 to be raised.

Note that in the present exemplary embodiment, a protruding portion may be integrally provided so as to protrude from the bottom wall of the fitting tube 28C of the motor base 28, with the protruding portion abutted by the magnet 34, thereby enabling a low sliding resistance arising from rotation of the magnet 34 with respect to the motor base 28. Moreover in such cases, an abutting face of the protruding portion against the magnet 34 may be curved in a convex shape, thereby enabling the sliding resistance arising from rotation of the magnet 34 with respect to the motor base 28 to be effectively lowered.

What is claimed is:

1. A deflector device comprising:
   a deflector body configured to be deployed in front of a front wheel of a vehicle by being rotated in a deploy direction to suppress airflow onto the front wheel and configured to be stowed in a vehicle body by being rotated in a stow direction;
   a housing body provided at a vehicle body side;
   a partition member configured to partition a housing body interior into one side and another side;
   a drive mechanism retained at the partition member and driven such that the deflector body is rotated;
   a detected portion housed at the one side of the housing body interior and configured to be rotated when the deflector body is rotated; and
   a detection section housed at the other side of the housing body interior and configured to detect a rotational position of the detected portion.

2. The deflector device of claim 1, wherein the partition member is abutted by the detected portion.

3. The deflector device of claim 2, further comprising a protruding portion provided protruding from the partition member and abutted by the detected portion.

4. The deflector device of claim 1, wherein the detection section is positioned by the partition member.

5. The deflector device of claim 1, further comprising a rotation member housed at the one side of the housing body interior and configured to be rotated when the deflector body is rotated, the detected portion being press-fitted into the rotation member.

6. The deflector device of claim 5, wherein the partition member supports the rotation member so as to be capable of rotating.

7. The deflector device of claim 5, wherein the rotation member is rotated as one with the deflector body.

8. The deflector device of claim 1, wherein the partition member is fitted to the housing body interior.

9. The deflector device of claim 1, wherein the partition member is fixed to the housing body interior.

10. The deflector device of claim 1, wherein the detected portion is rotated as one with the deflector body.

* * * * *